(12) United States Patent
Ragavan Rajagopalan et al.

(10) Patent No.: US 12,353,564 B2
(45) Date of Patent: Jul. 8, 2025

(54) SUPPORTING SECURE WORKSPACES IN HETEROGENOUS ENVIRONMENTS

(71) Applicant: Dell Products L.P., Round Rock, TX (US)

(72) Inventors: Srinivasa Ragavan Rajagopalan, Bangalore (IN); Gokul Thiruchengode Vajravel, Bangalore (IN); Vivekanandh Narayanasamy Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 409 days.

(21) Appl. No.: 18/051,671

(22) Filed: Nov. 1, 2022

(65) Prior Publication Data

US 2024/0143780 A1    May 2, 2024

(51) Int. Cl.
*G06F 21/57* (2013.01)
*G06F 21/53* (2013.01)
*G06F 21/54* (2013.01)

(52) U.S. Cl.
CPC ............ *G06F 21/577* (2013.01); *G06F 21/53* (2013.01); *G06F 21/54* (2013.01); *G06F 21/575* (2013.01)

(58) Field of Classification Search
CPC ........ G06F 21/577; G06F 21/53; G06F 21/54; G06F 21/575
See application file for complete search history.

(56) References Cited

U.S. PATENT DOCUMENTS

| | | | |
|---|---|---|---|
| 8,676,781 B1* | 3/2014 | Galperin | G06Q 30/0241 707/707 |
| 9,087,063 B2* | 7/2015 | Wei | G06F 11/1469 |
| 2007/0168478 A1* | 7/2007 | Crosbie | G06F 8/63 709/221 |

* cited by examiner

*Primary Examiner* — Paul E Callahan
(74) *Attorney, Agent, or Firm* — Kirton McConkie; Brian Tucker

(57) ABSTRACT

Secure workspaces can be supported in heterogenous environments. Snapshots of secure workspaces can be created when the secure workspaces are deployed on a user's primary user computing device. When a user desires to access secure workspaces on a secondary user computing device, information about and a trust for the secondary user computing device can be determined. Based on the information and the trust, it can then be determined how the snapshots of the secure workspaces will be used to make the secure workspaces available to the secondary user computing device. In some cases, a best-known configuration for a secure workspace can be determined and applied.

19 Claims, 20 Drawing Sheets

SUPPORTING SECURE WORKSPACES IN HETEROGENOUS ENVIRONMENTS

CROSS-REFERENCE TO RELATED APPLICATIONS

N/A

BACKGROUND

In the context of this application, a secure workspace refers to an isolated environment in which one or more applications may be hosted on a computing device. A secure workspace, which may also be referred to as a sandbox, is oftentimes implemented using a virtual machine, a software-based container, a virtual desktop infrastructure, or a cloud container. An application hosted in a secure workspace will be isolated from resources in the external environment and from other applications or services hosted external to the secure workspace, including native applications and applications hosted in other secure workspaces.

Secure workspaces facilitate working from any user computing device. For example, an employer may allow its employees to use any of their user computing devices in any location to access applications by deploying the applications in secure workspaces. However, it is a tedious and technical challenge to configure secure workspaces that can be deployed to any user computing device particularly when the user computing devices may have different operating systems (e.g., Windows and Linux) and/or when the user computing devices may not be trusted (e.g., an employee's personal laptop). In a scenario where a user's primary user computing device has crashed (e.g., an employee's work laptop) thereby preventing the user from accessing applications hosted in secure workspaces on the primary user computing device, it may be critical to quickly deploy secure workspaces for hosting the applications to a secondary user computing device to allow the user to resume productivity.

BRIEF SUMMARY

The present invention extends to systems, methods and computer program products for supporting secure workspaces in heterogenous environments. Snapshots of secure workspaces can be created when the secure workspaces are deployed on a user's primary user computing device. When a user desires to access secure workspaces on a secondary user computing device, information about and a trust for the secondary user computing device can be determined. Based on the information and the trust, it can then be determined how the snapshots of the secure workspaces will be used to make the secure workspaces available to the secondary user computing device. In some cases, a best-known configuration for a secure workspace can be determined and applied.

In some embodiments, the present invention may be implemented as method for supporting secure workspaces in heterogenous environments. A snapshot of a secure workspace that is deployed on a user's primary user computing device may be maintained. It can be detected that the user desires to access the secure workspace on the user's secondary user computing device. Operating system details and trust information for the user's secondary user computing device can be determined. The secure workspace can be provided to the secondary user computing device based on the operating system details and the trust information for the user's secondary user computing device.

In some embodiments, the present invention may be implemented as computer storage media storing computer executable instructions which when executed implement a method for supporting secure workspaces in heterogenous environments. A snapshot of a secure workspace that is deployed on a user's primary user computing device may be maintained. It can be detected that the user desires to access the secure workspace on the user's secondary user computing device. It can then be determined whether the user's secondary user computing device is trusted. When the user's secondary user computing device is trusted, the secure workspace can be deployed on the user's secondary user computing device. When the user's secondary user computing device is not trust, the secure workspace can be streamed to the user's secondary user computing device.

In some embodiments, the present invention may be implemented as a system that includes a primary user computing device on which a secure workspace is deployed, a management solution that stores a snapshot of the secure workspace, and a secondary user computing device. The management solution may be configured to selectively provide the secondary user computing device with access to the secure workspace by one of: deploying the snapshot to the secondary user computing device; converting the snapshot and deploying the converted snapshot to the secondary user computing device; or streaming the secure workspace to the secondary user computing device using the snapshot.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
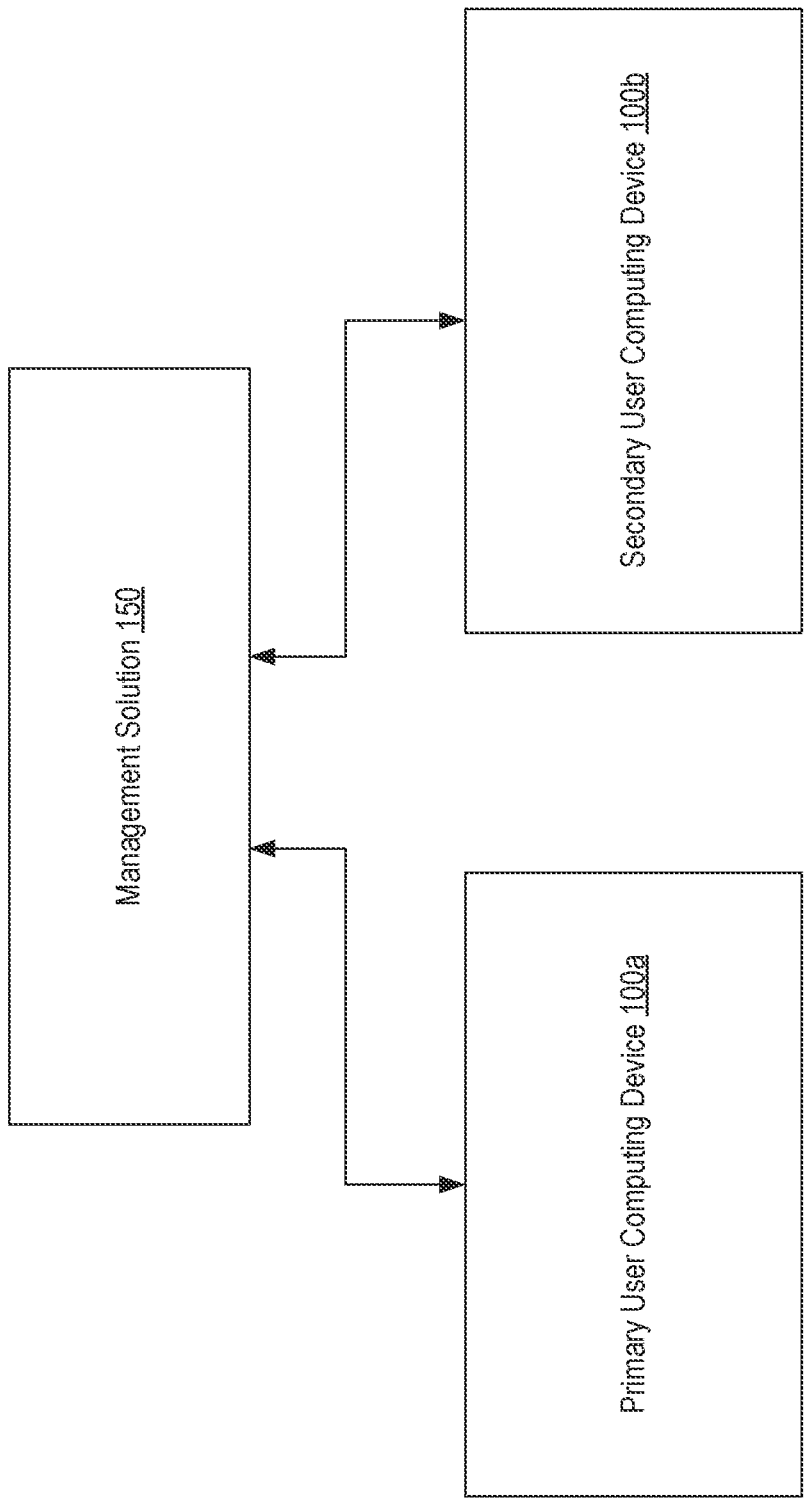
FIG. 1 provides an example of a computing environment in which embodiments of the present invention may be implemented.

FIG. 1 provides an example of a computing environment in which one or more embodiments of the present invention may be implemented. This computing environment includes a management solution 150 which is used to manage a primary user computing device 100a and a secondary user computing device 100b for purposes of supporting secure workspaces on both user computing devices. Although only a single set of primary and secondary user computing devices 100a and 100b is shown, management solution 150 would typically be used to manage a large number of user computing devices. For example, primary user computing device 100a could represent desktops, laptops, tablets, smartphones, etc. that an employer provides to its employees or allows its employees to use for work purposes, and secondary user computing device 100b could represent desktops, laptops, tablets, smartphones, etc. that the employees would also like to use for work purposes (e.g., when the primary user computing device crashes, when the employee is at home and does not have access to the primary user computing device, at a time or in a location where the employee prefers using the secondary user computing device, etc.). Of primary relevance is that both primary user computing device 100a and secondary user computing device 100b are capable of deploying secure workspaces in which a user's applications are hosted.

Figure 2:
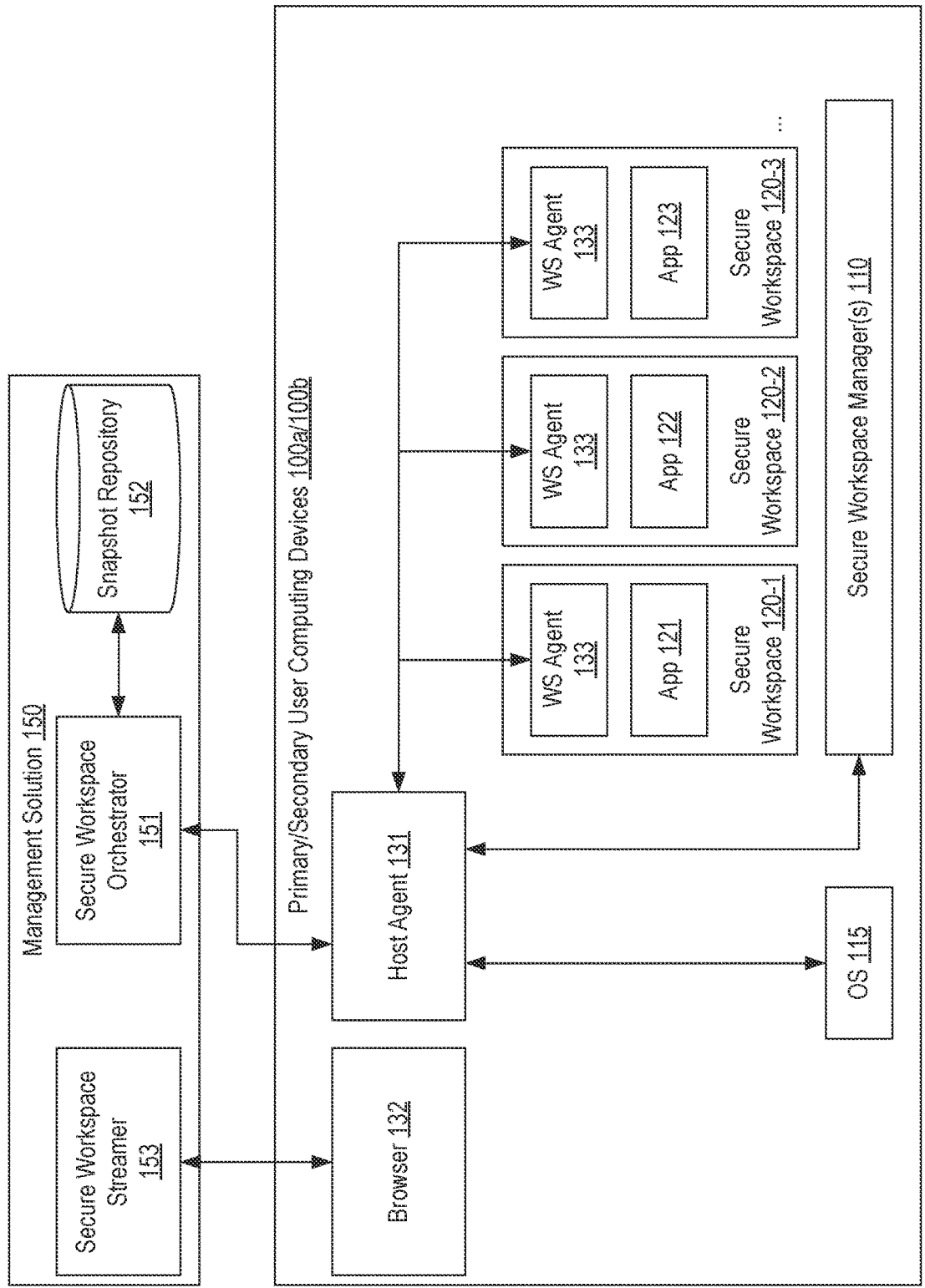
FIG. 2 provides another example of a computing environment in which embodiments of the present invention may be implemented.

FIG. 2 provides an example of components that management solution 150 and primary and/or secondary user computing devices 100a and 100b (generally user computing device 100) may have in some embodiments of the present invention. User computing device 100 is shown as having one or more secure workspace managers 110. A secure workspace manager is intended to represent the components on user computing device 100 that allow secure workspaces to be deployed. For example, a secure workspace manager may be a hypervisor (e.g., Hyper-V) when virtual machines are used to implement secure workspaces, a container daemon when containers (e.g., Docker containers) are used to implement secure workspaces, a sandbox manager when sandboxes (e.g., Sandboxie isolated environments) are used to implement secure workspaces, a Webapp manager when a browser sandbox is used to implement secure workspaces, etc. In the depicted example, it is assumed that three secure workspaces 120-1 through 120-3 are deployed on user computing device 100. However, there could be any number and/or type of secure workspaces at any given time. These secure workspaces are represented as hosting applications 121, 122, and 123 respectively. Notably, a secure workspace could include more than one application.

User computing device 100 also includes an operating system (OS) 115 which can be considered the base operating system to distinguish it from an operating system inside any of the secure workspaces (e.g., inside a virtual machine). Some or all the secure workspaces could run in the context of operating system 115 (e.g., when the secure workspace is a software container) and/or some or all the secure workspaces could run in separate virtual machines. User computing device also includes host agent 131 which can run in the context of operating system 115.

Host agent 131 can be configured to implement management services on user computing device 100 including the deployment and management of secure workspaces on user computing device 100. For example, a secure workspace orchestrator 151 on management solution 150 may interface with host agent 131 to provide secure workspaces (or at least information for creating secure workspaces), and host agent 131 may interface with secure workspace manager(s) 110 to create and manage the secure workspaces.

Each secure workspace can include a workspace agent 133 that is configured to interface with host agent 131 such as to facilitate the taking of snapshots of the secure workspaces deployed on primary user computing device 100a. These snapshots could be stored in a snapshot repository 152 on or accessible to management solution 150. In some embodiments, a secondary user computing device 100b may not be configured to take snapshots of secure workspaces deployed thereon.

Management solution 150 can also include a secure workspace streamer 153 that can be configured to stream secure workspaces to user computing device 100 via a browser 132 as opposed to the secure workspaces being deployed on the user computing device. As described in detail below, this streaming of secure workspaces may be implemented in scenarios where a secondary user computing device 100b is not trusted or does not support the deployment of secure workspaces.

Figure 3A:
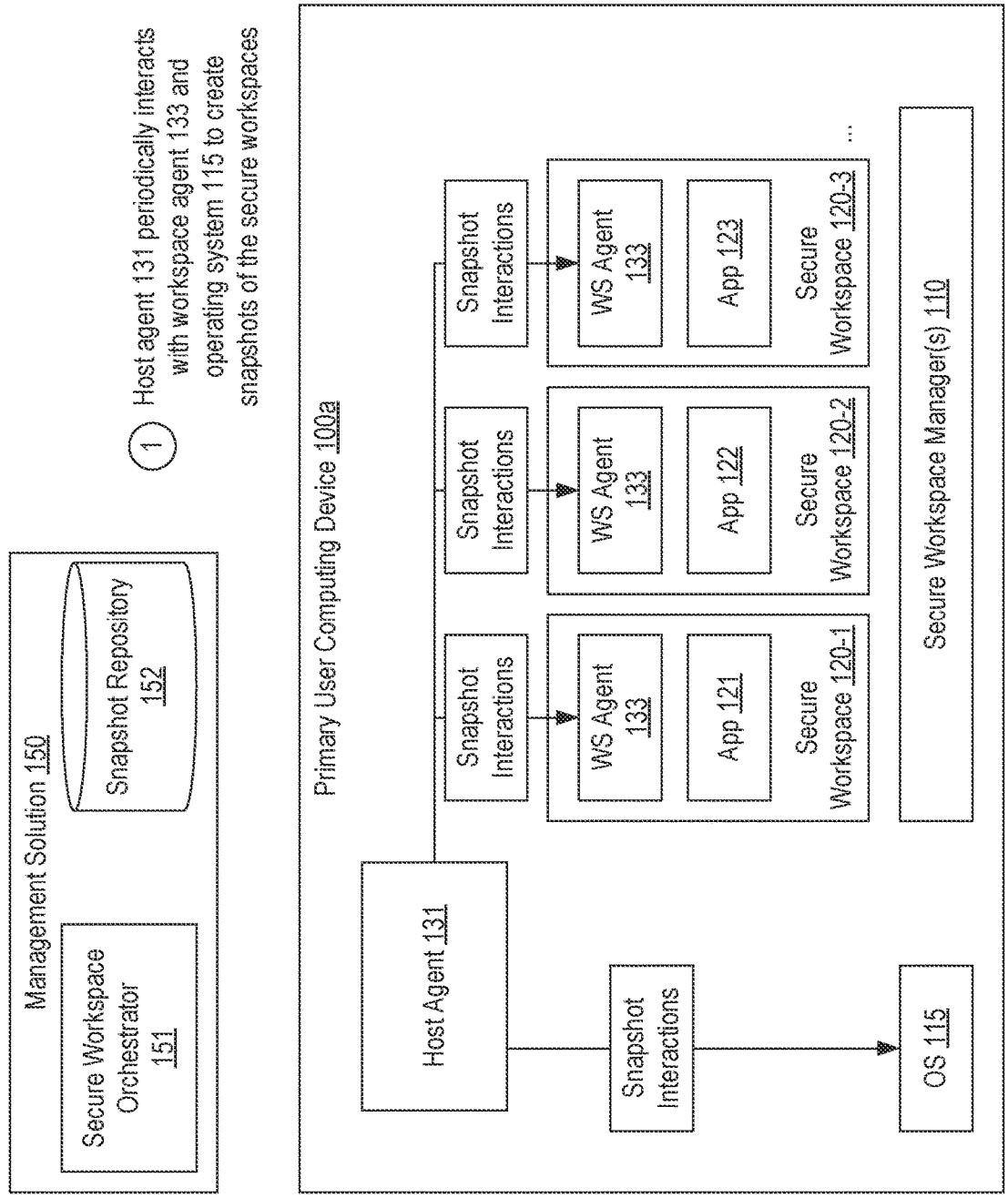
FIGS. 3A and 3B provide an example of how snapshots of secure workspaces can be created in accordance with one or more embodiments of the present invention.
Figure 3B:
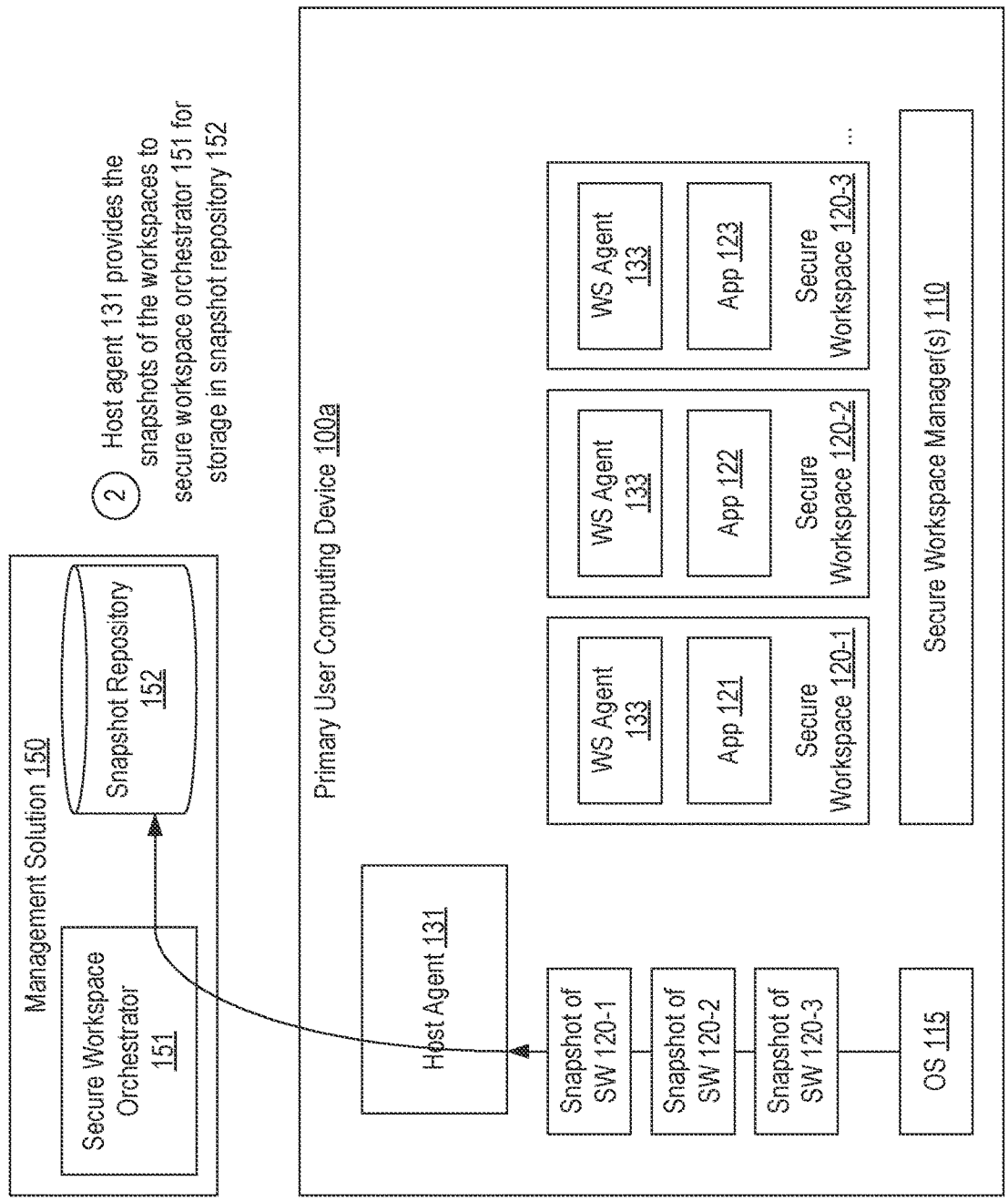

FIGS. 3A and 3B represent how host agent 131 on primary user computing device 100a can periodically create snapshots of deployed secure workspaces. In FIG. 3A, it is assumed that secure workspaces 120-1 through 120-3 are deployed on primary user computing device 100a. In step 1, host agent 131 can interact with workspace agent 133 and operating system 115 to create snapshots of each secure workspace. For example, host agent 131 could interact with workspace agent 133 to cause workspace agent 133 to flush the cache within the secure workspace to ensure that the snapshot captures the current data of each application running in the secure workspace. Host agent 131 can use tools provided by operating system 115 to create the snapshots. In some embodiments, each snapshot could be in the form of a VHD file (e.g., when operating system 115 is a version of Windows) or a VDI file (e.g., when operating system 115 is a version of Linux). However, a snapshot could be in any suitable format.

Turning to FIG. 3B, in step 2, host agent 131 can retrieve the created snapshots and provide them to secure workspace orchestrator 151 for storage in snapshot repository 152. As stated above, this process can be periodically performed so that current snapshots exist in snapshot repository 152 for each secure workspace deployed on a primary user computing device 100a. Each snapshot may be tagged with an identifier of the primary user computing device 100a from which it originated and/or with an identifier of the user of the primary user computing device 100a.

Figure 4A:
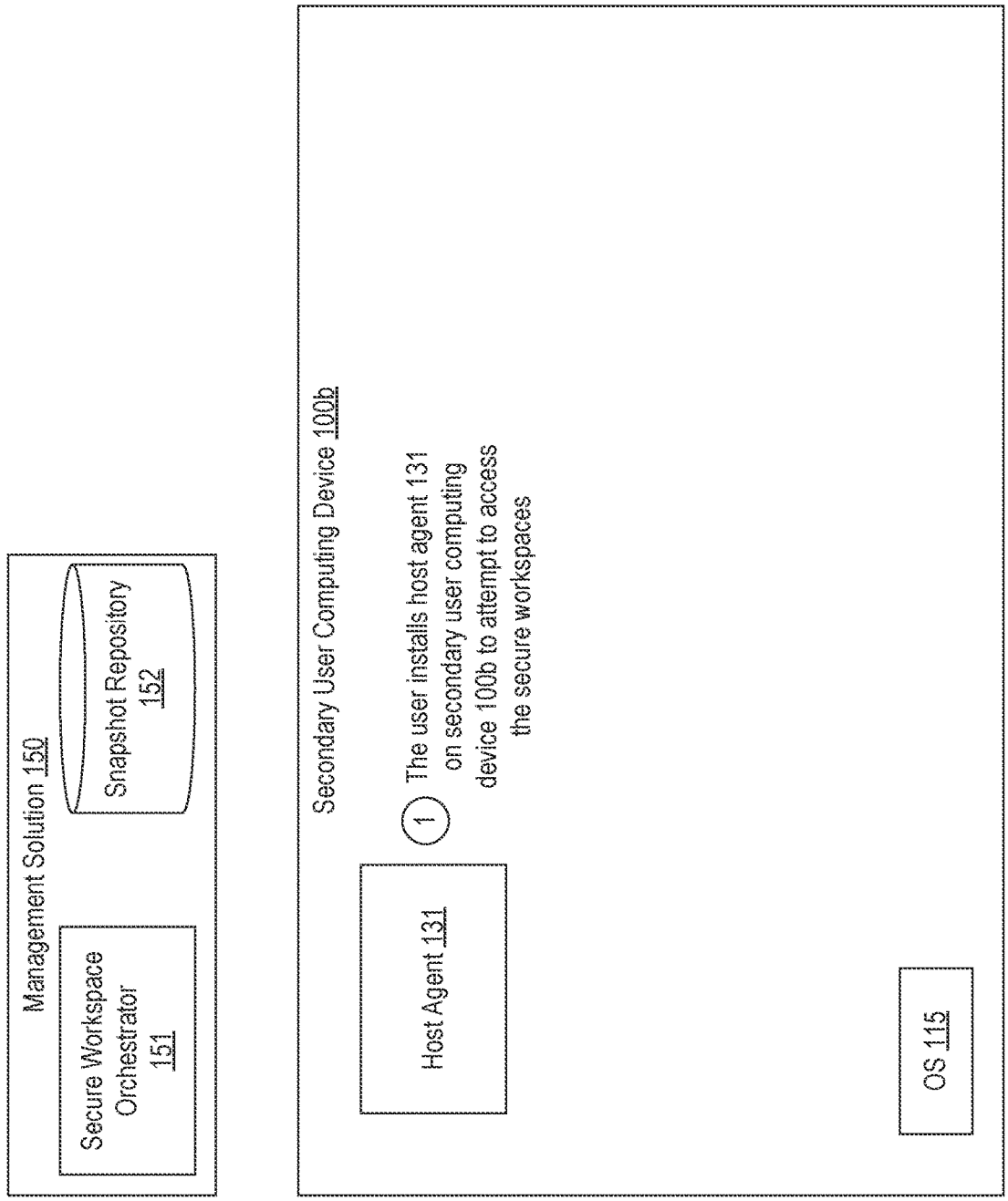
FIGS. 4A-4C provide an example of how a secure workspace outcome can be determined for a secondary user computing device in accordance with one or more embodiments of the present invention.
Figure 4B:
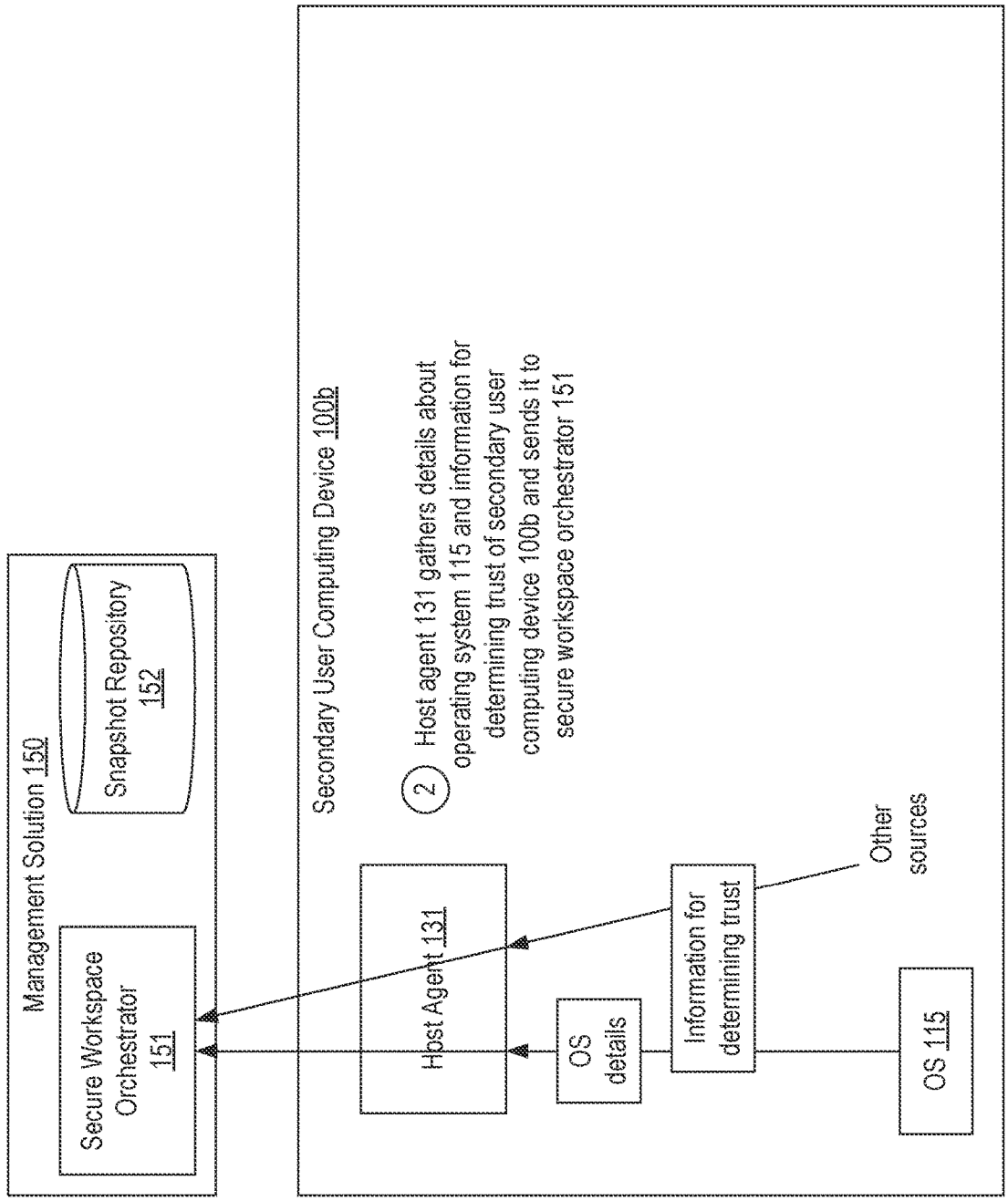
Figure 4C:
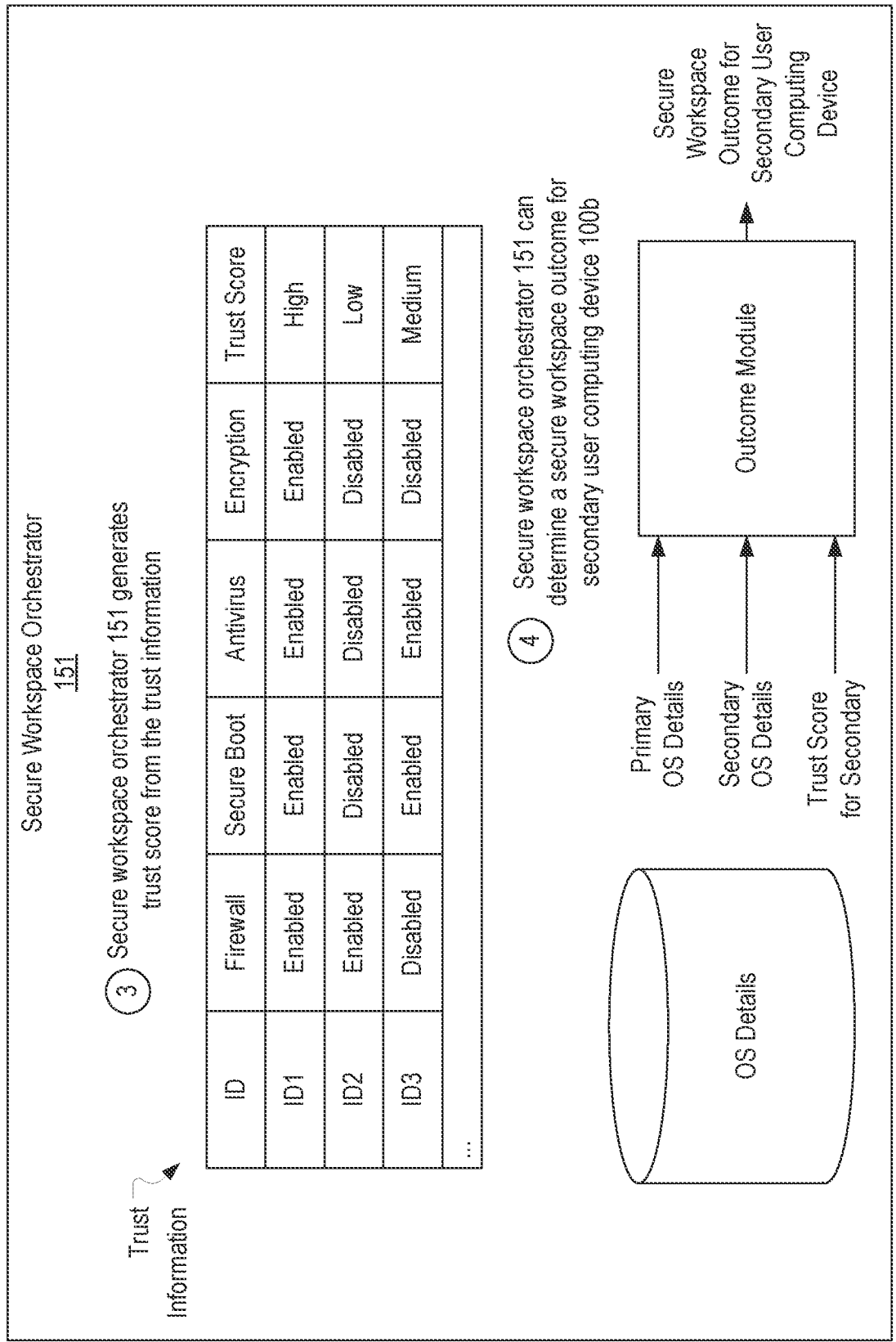

FIGS. 4A-4C provide an example of functionality that can be performed when the user of primary user computing device 100a desires to use secondary user computing 100b to access secure workspaces 120-1, 120-2, and 120-3 (or applications 121, 122, and 123). As indicated above, this could be in response to primary user computing device 100a crashing, when the user only has access to secondary user computing device 100b, or when the user may otherwise prefer using secondary user computing device 100b.

Turning to FIG. 4A, in step 1, it is assumed that the user installs host agent 131 on secondary user computing device 100b to attempt to access secure workspaces 120-1 through 120-3. In some cases, host agent 131 may already be installed, and in such cases, step 1 could entail loading host agent 131 on secondary user computing device 100b for the purpose of gaining access to secure workspaces 120-1 through 120-3.

Turning to FIG. 4B, in step 2, host agent 131 can gather details about operating system 115 on secondary user computing device 110b (OS details) and information for determining trust of secondary user computing device 110b (trust information). The OS details could include a type and version of the operating system such as a version of Windows, a version of Ubuntu, a version of Redhat, etc. The trust details could include whether a firewall, secure boot, antivirus protection, disk encryption, etc. are enabled or disabled. As part of step 2, host agent 131 can provide the OS details and the trust information to secure workspace orchestrator 151.

Turning to FIG. 4C, in step 3, secure workspace orchestrator 151 can use the trust information to generate a trust score for secondary user computing device 100b. FIG. 4C provides three example trust scores that have been generated from trust information gathered for three secondary user computing devices 100b having IDs of ID1, ID2, and ID3. In this example, the trust score is high, medium, or low. However, other trust score schemes could be used. In some embodiments, secure workspace orchestrator 151 may store these trust scores to be used when users subsequently attempt to access secure workspaces from the respective secondary user computing device.

In step 4, secure workspace orchestrator 151 can determine a secure workspace outcome for secondary user computing device 100b. For example, an outcome module of secure workspace orchestrator 151 may consider the OS details from primary user computing device 100a, the OS details from secondary user computing device 100b, and the trust score for secondary user computing device 100b to determine this outcome. Secure workspace orchestrator 151 may maintain the OS details for each primary user computing device 100a and each secondary user computing device 100b to enable this determination of secure workspace outcomes. FIGS. 5A and 5B, 6A and 6B, and 7A and 7B each represent a different secure workspace outcome.

Figure 5A:
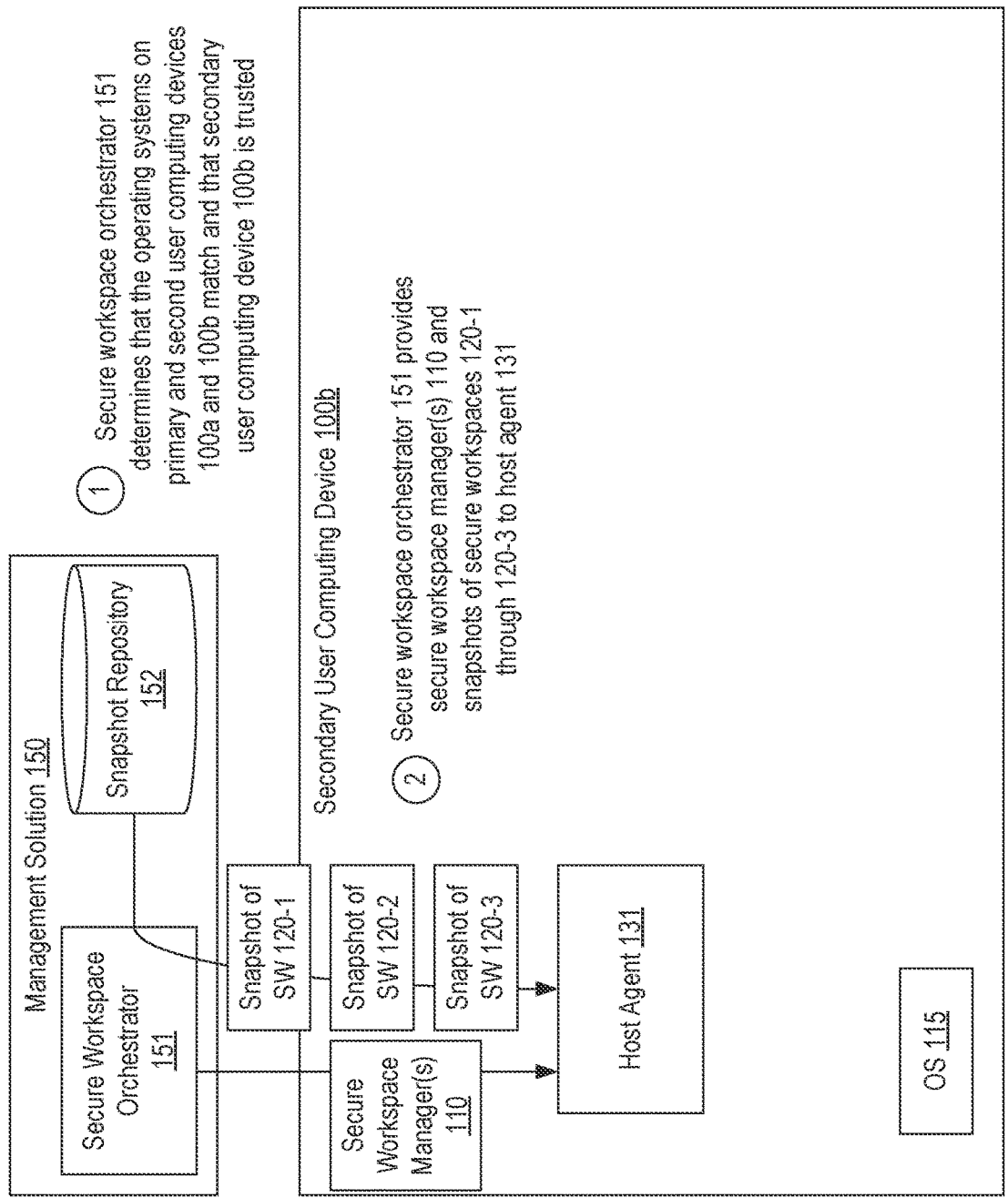
FIGS. 5A and 5B provide an example of a first secure workspace outcome for a secondary user computing device in accordance with one or more embodiments of the present invention.
Figure 5B:
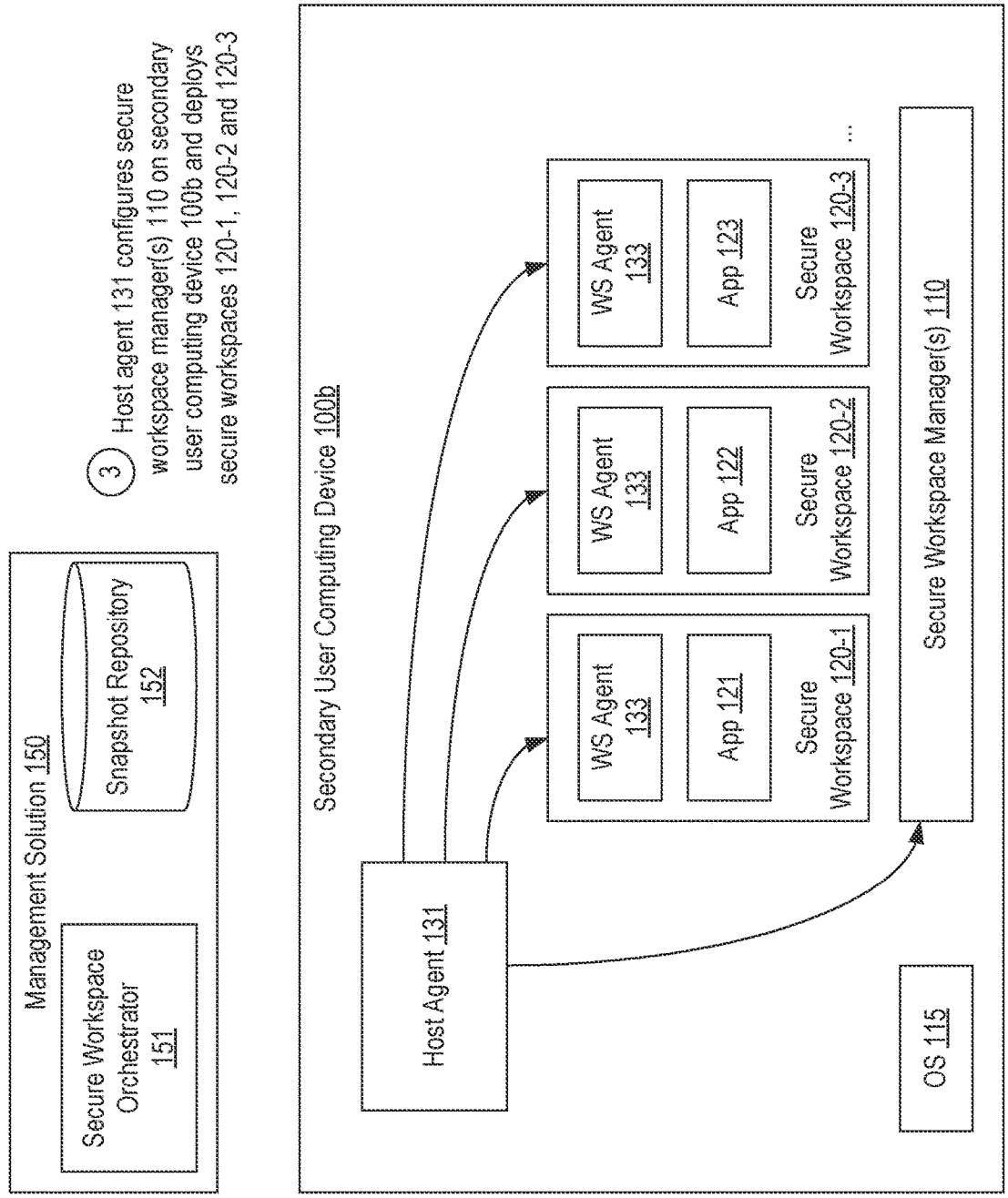

Turning to FIGS. 5A and 5B, in step 1, it is assumed that secure workspace orchestrator 151 determines that the OS details for secondary user computing device 100b match the OS details for primary user computing device 100a, which could be the case when both user computing devices run a version of Windows or both user computing devices run a version of Linux, and that secondary user computing device 100b is trusted, which may be the case when the trust score is high or medium. In step 2, secure workspace 151 can provide secure workspace manager(s) 110 (or configurations for secure workspace manager(s) 110 if secure workspace manager(s) 110 are already available on secondary user computing device 100b) and the snapshots (or images) of secure workspaces 120-1 through 120-3 to host agent 131 on secondary user computing device 100b.

In step 3 shown in FIG. 5B, host agent 131 can configure secure workspace manager(s) 110 on secondary user computing device 100b and may then deploy secure workspaces 120-1 through 120-3 from the snapshots. In other words, in these cases where the OS details match and the secondary user computing device is trusted, secure workspace orchestrator 151 and host agent 131 may directly recreate on secondary user computing device 100b the secure workspace environment that existed on primary user computing device 100a. At this point, the user will be able to access applications 121 through 123 on secondary user computing device 100b in the same or similar manner as the user accessed these applications on primary user computing device 100a. Also, in some embodiments, host agent 131 may begin treating secondary user computing device 100b as a primary user computing device by taking snapshots of secure workspaces 120-1 through 120-3.

Figure 6A:
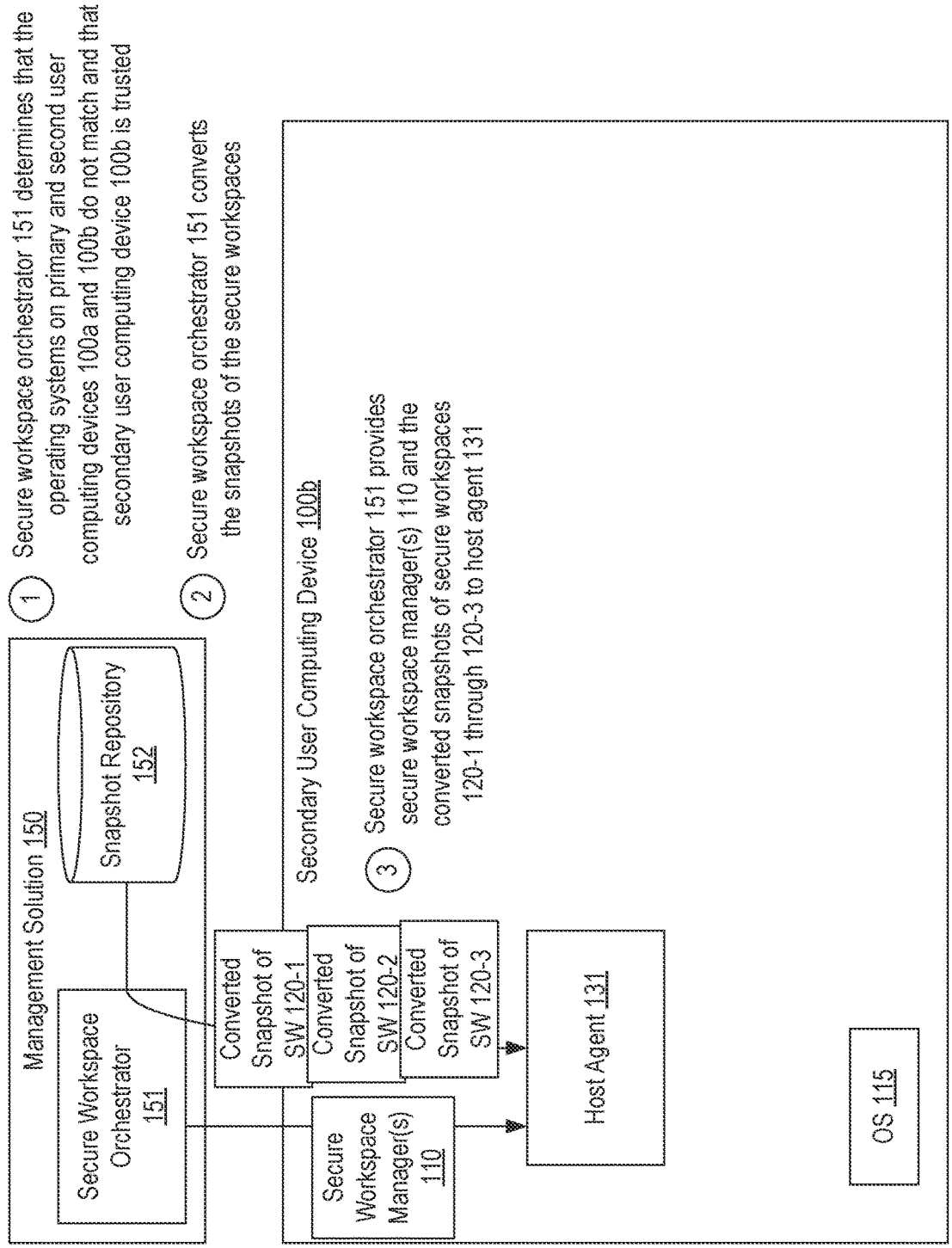
FIGS. 6A and 6B provide an example of a second secure workspace outcome for a secondary user computing device in accordance with one or more embodiments of the present invention.
Figure 6B:
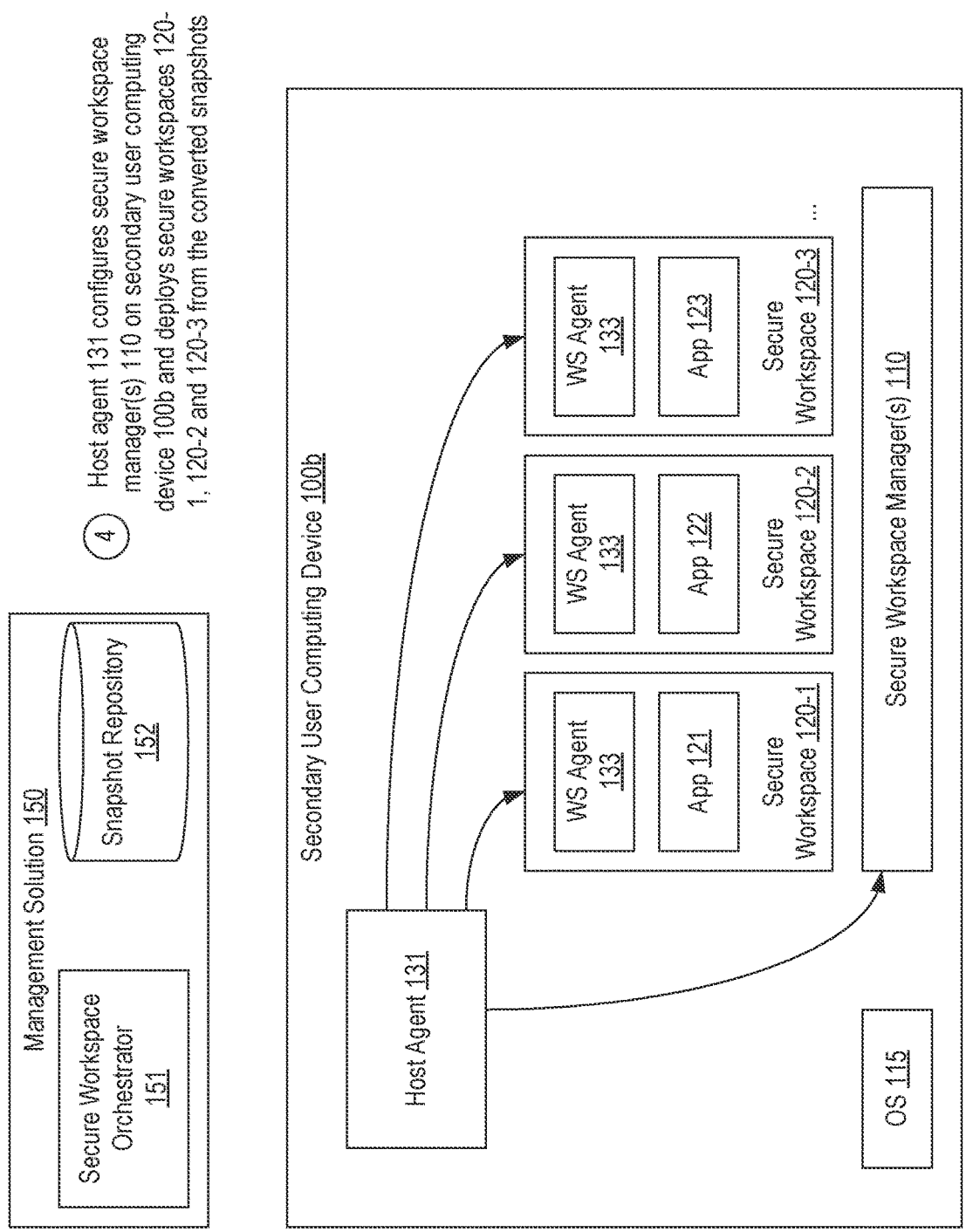

Turning to FIGS. 6A and 6B, in step 1, it is assumed that secure workspace orchestrator 151 determines that the OS details for secondary user computing device 100b do not match the OS details for primary user computing device 100a, which could be the case when one runs a version of Windows and the other runs a version of Linux, and that secondary user computing device 100b is trusted. In step 2, and because of the mismatch in the operating systems, secure workspace orchestrator 151 may convert the snapshots of secure workspaces 120-1 through 120-3 (e.g., from VHD format to VDI format or vice versa). Then, in step 3, secure workspace 151 can provide secure workspace manager(s) 110 and the converted snapshots of secure workspaces 120-1 through 120-3 to host agent 131 on secondary user computing device 100b.

In step 4 shown in FIG. 6B, host agent 131 can configure secure workspace manager(s) 110 on secondary user computing device 100b and may then deploy secure workspaces 120-1 through 120-3 from the converted snapshots. In other words, in these cases where the OS details do not match and the secondary user computing device is trusted, secure workspace orchestrator 151 and host agent 131 may recreate on secondary user computing device 100b the secure workspace environment that existed on primary user computing device 100a by converting the snapshots.

In both of the above examples, although secondary user computing device 100b may be sufficiently trusted to allow the secure workspaces to be deployed on secondary user computing device 100b, if the trust score is not sufficiently high, secure workspace orchestrator 151 may also provide policies to host agent 131 that must be applied before the secure workspaces can be deployed. For example, these policies could include enabling one or more of a firewall, secure boot, antivirus protection, disk encryption, etc.

Figure 7A:
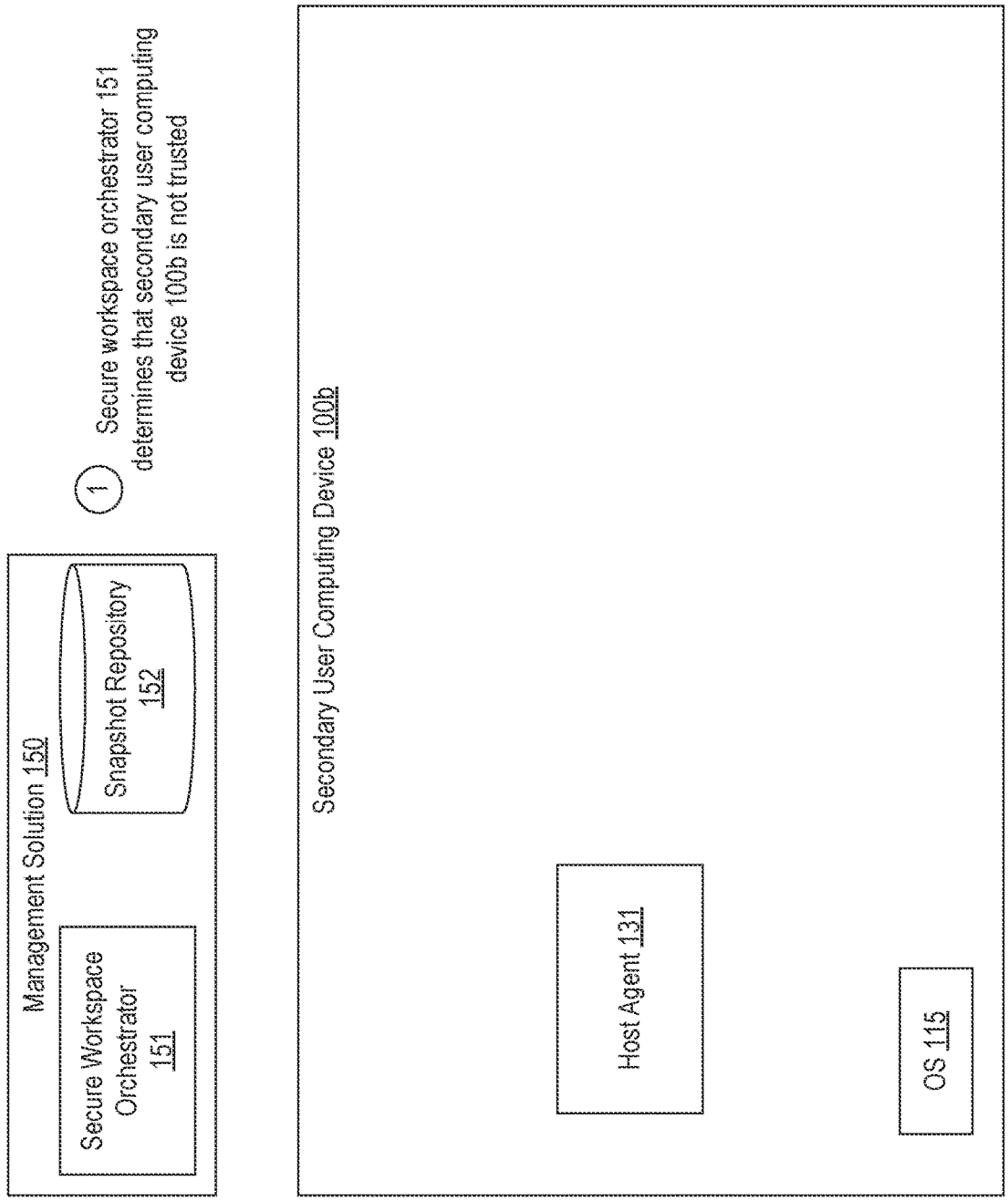
FIGS. 7A and 7B provide an example of a third secure workspace outcome for a secondary user computing device in accordance with one or more embodiments of the present invention.
Figure 7B:
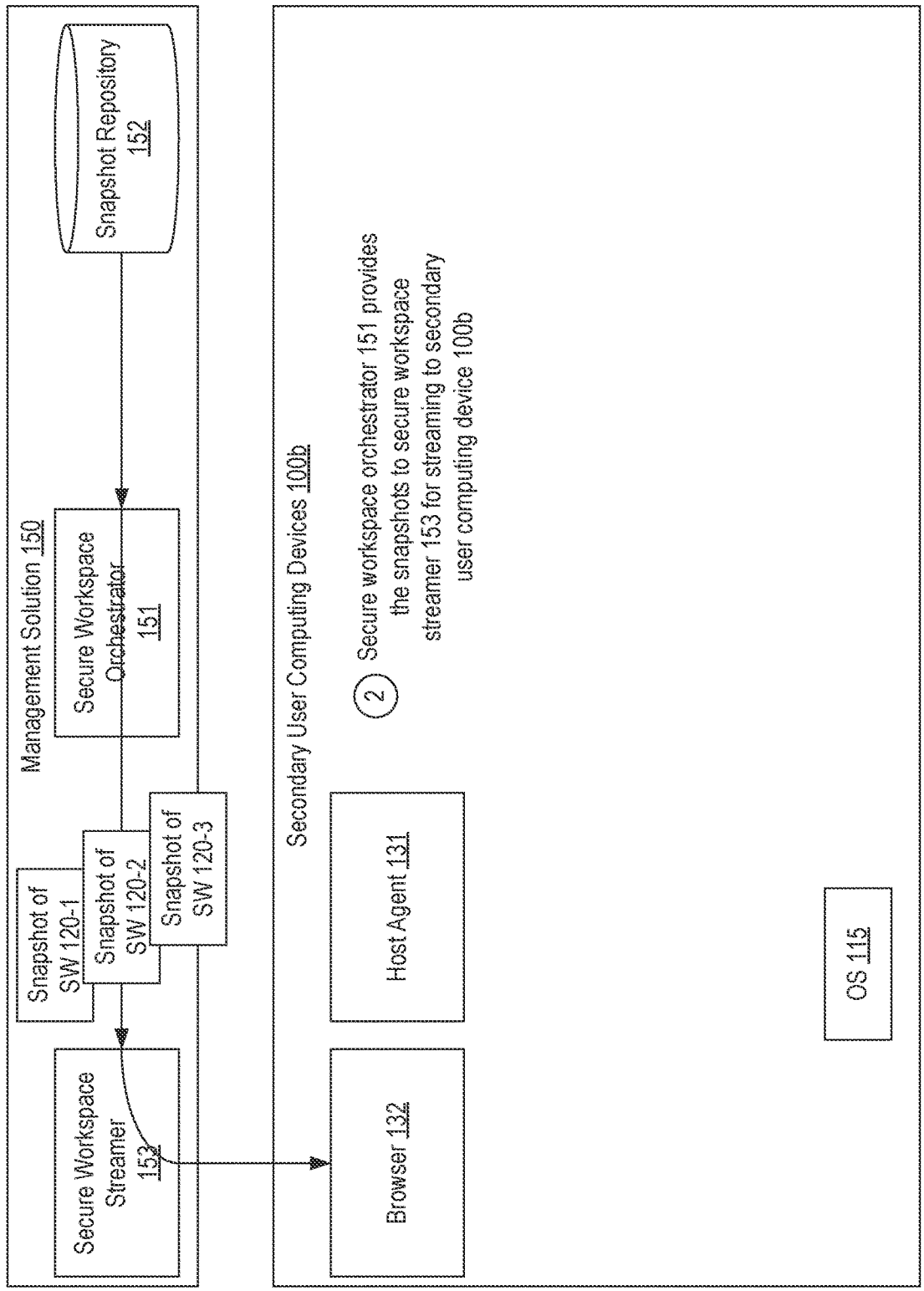

Turning to FIGS. 7A and 7B, in step 1, it is assumed that secure workspace orchestrator 151 determines that secondary user computing device 100b is not trusted (e.g., if the trust score is low). In step 2, and regardless of whether the OS details match, secure workspace orchestrator 151 may provide the snapshots of secure workspaces 120-1 through 120-3 to secure workspace streamer 153 to cause the secure workspaces to be streamed via browser 132 to secondary user computing device 100b. For example, secure workspace streamer 153 could deploy the secure workspaces from the snapshots on management solution 150 (or associated components) and then stream user interfaces for applications 121, 122, or 123 via browser-supported protocols. Although not shown, in such embodiments, secure workspace orchestrator 151 and/or secure workspace streamer 153 may interface with host agent 131 to initiate the launching of browser 132 (or browser windows) and the connection to the streaming secure workspaces (e.g., via corresponding URLs).

In summary, when a user loses access to a primary user computing device 100a or otherwise prefers using a secondary user computing device 100b, embodiments of the present invention enable the user's secure workspaces to become accessible quickly and automatically on the secondary user computing device without sacrificing security. As such, users can retain high levels of productivity regardless of the reason for using a secondary user computing device and even when the primary and secondary user computing devices create a heterogenous environment.

Figure 8:
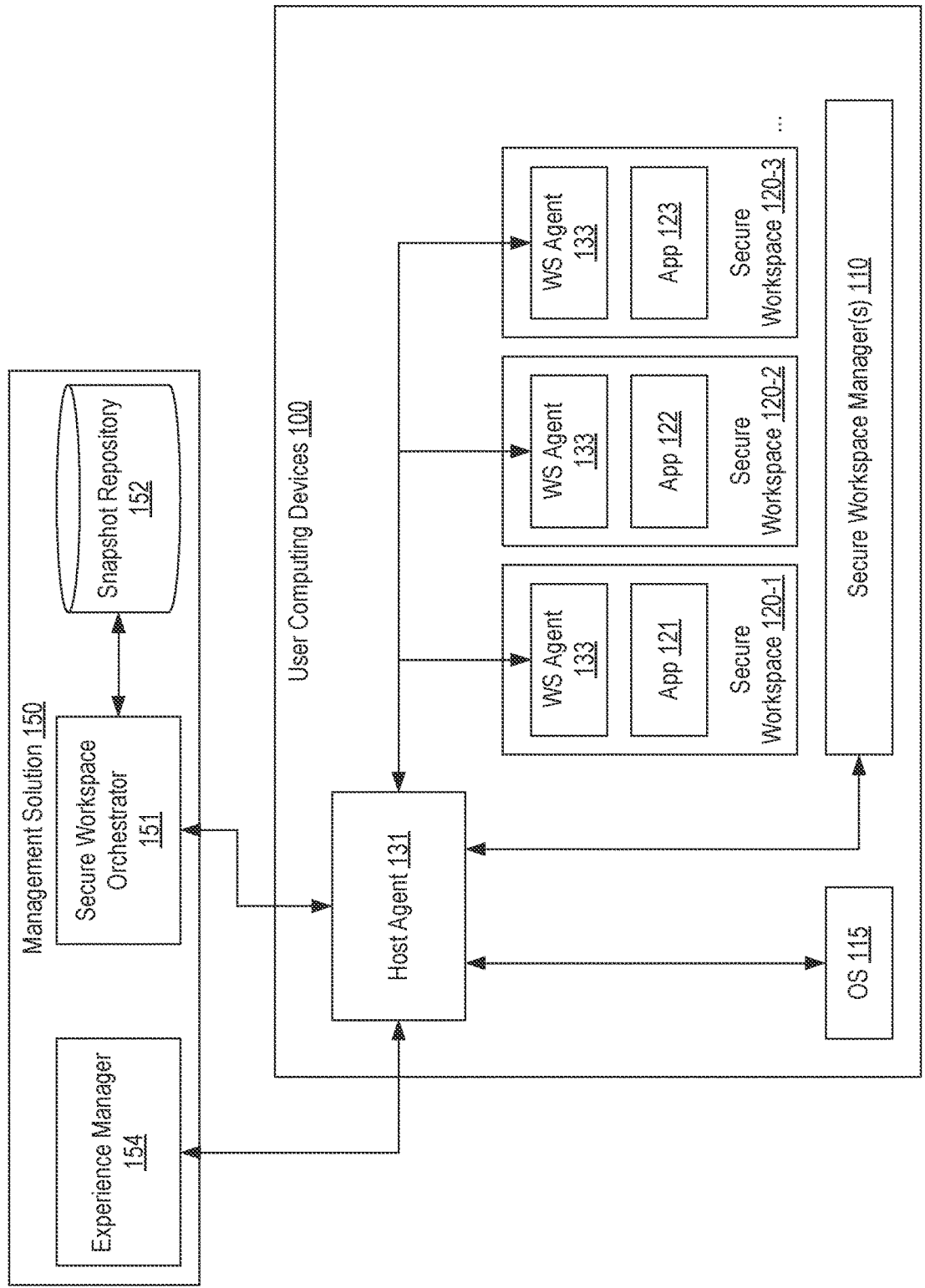
FIG. 8 provides another example of a computing environment in which embodiments of the present invention may be implemented.

In some embodiments, such as is represented in FIG. 8, management solution 150 may include an experience manager 154 that can be configured to identify best-known configurations for secure workspaces and automatically apply them on user computing devices 100. A best-known configuration can define a combination of dependent libraries, runtime components, drivers, configurations of operating system 115, configurations of the respective secure workspace manager 110, concurrent deployed secure workspaces, etc. that provide the best user experience for a particular secure workspace. Such components will be referred to as BKC components to represent that they may impact the best-known configuration for a secure workspace.

FIGS. 9A-9F provide an example of how a best-known configuration can be determined for secure workspace 120-1 and then automatically applied whenever secure workspace 120-1 is deployed on a user computing device 100.

Figure 9A:
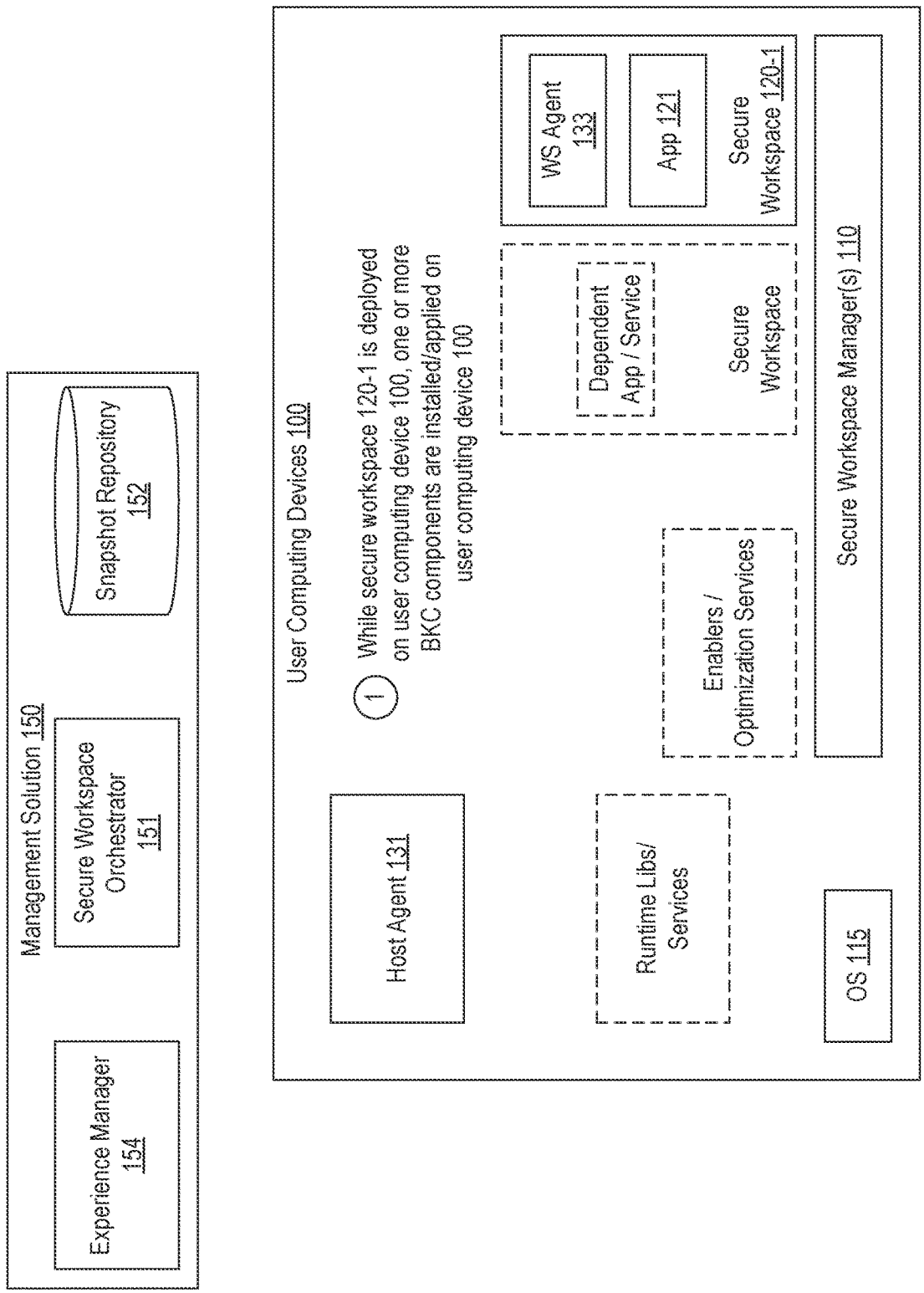
FIGS. 9A-9F provide an example of how a best-known configuration for a secure workspace can be determined and applied in accordance with one or more embodiments of the present invention.

Turning to FIG. 9A, in step 1 and while secure workspace 120-1 is deployed on user computing device 100, one or more BKC components are installed or applied on user computing device 100. FIG. 9A shows one or more runtime libraries and/or services, one or more enabler or optimization services (e.g., Intel Innovation Platform Framework), and a secure workspace hosting one or more dependent applications or services as just some examples of BKC components that could be installed, whether by the user, an admin, or otherwise. Additional examples of BKC components could include configurations of operating system 115 or configurations of secure workspace manager(s) 110.

Figure 9B:
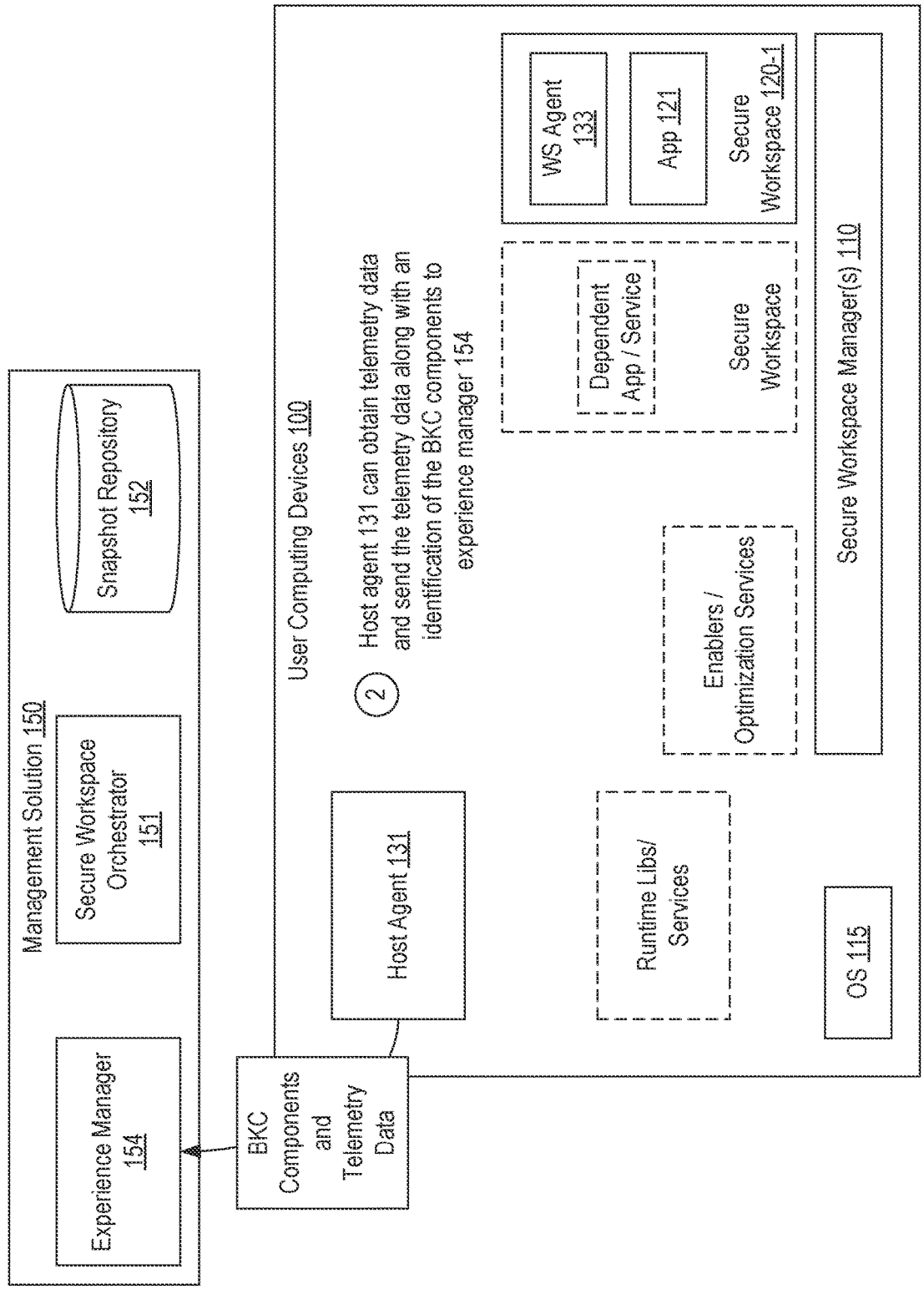

Turning to FIG. 9B, in step 2, host agent 131 can gather telemetry data after the installation/application of each BKC component and provide such telemetry data and an identification of the BKC component(s) that were present while the telemetry data was generated to experience manager 154. Host agent 131 could gather this telemetry data using tools provided by operating system 115 and/or by interfacing with workspace agent 133 inside secure workspace 120-1. Notably, the telemetry data is intended to represent how the performance of secure workspace 120-1 and/or user computing device 100 may have been impacted by the installation/application of a BKC component. This gathering and reporting of telemetry data can be performed on an ongoing basis so that experience manager 154 can compare current performance to past performance, including performance prior to the installation/application of a BKC component.

Figure 9C:
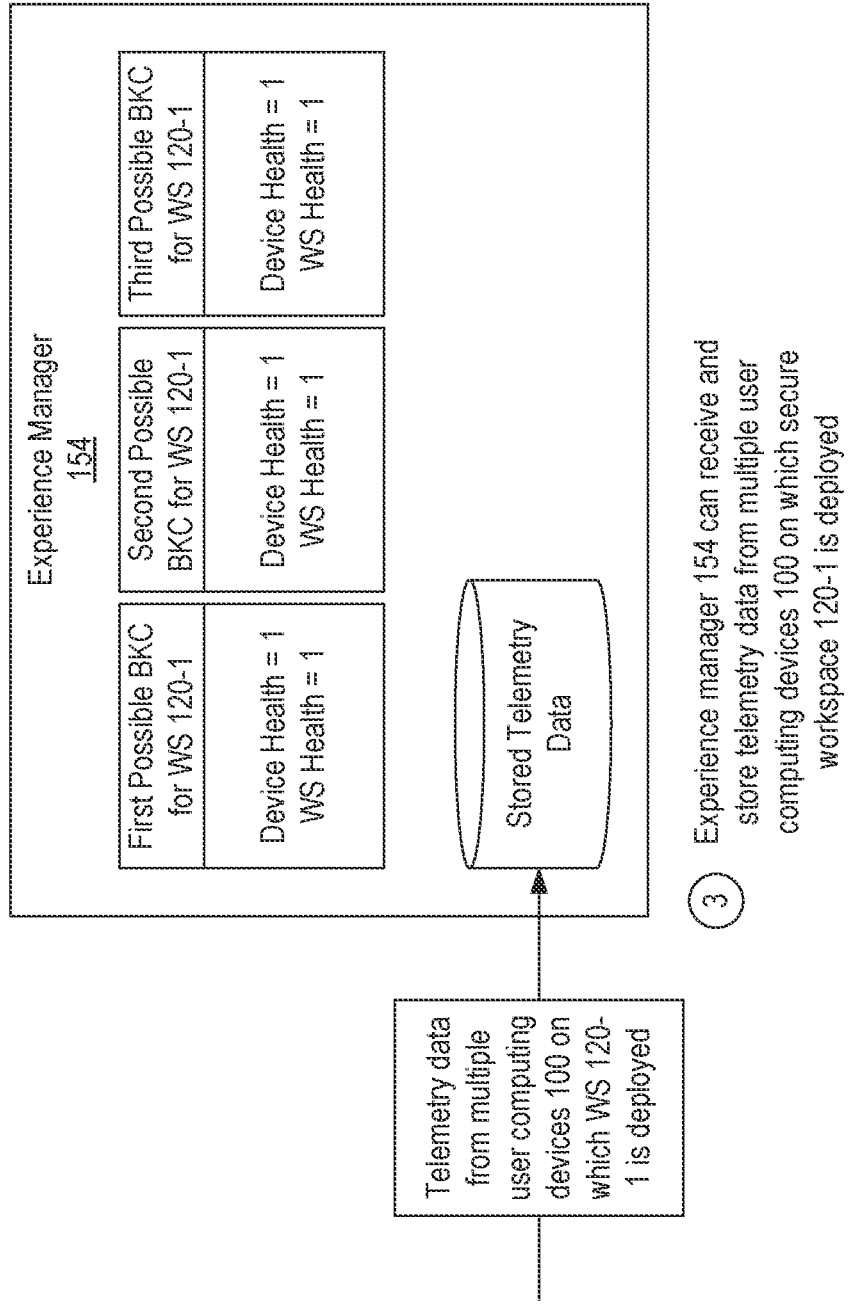

Turning to FIG. 9C, in step 3, experience manager 154 can receive and store telemetry data from multiple user computing devices 100 on which secure workspace 120-1 is deployed. In other words, steps 1 and 2 can be implemented on multiple user computing devices 100 to represent the performance of secure workspace 120-1 and/or the user computing device over time as BKC components are installed/applied on such user computing devices. FIG. 9C also shows that experience manager 154 can maintain health scores for one or more possible best-known configurations for secure workspace 120-1 (and other secure workspaces). In the depicted example, it is assumed that experience manager 154 has received telemetry data defining three possible best-known configurations on user computing devices 100 hosting secure workspace 120-1. For example, users could have installed different BKC components or combinations of BKC components on user computing devices 100. The health scores could include a device health score representing whether the possible best-known configuration is improving the performance of user computing devices 100 and a secure workspace (WS) health score representing whether the possible best-known configuration is improving the performance of secure workspace 120-1. For purposes of this example, it is assumed that a best-known configuration for secure workspace 120-1 has not yet been determined.

Figure 9D:
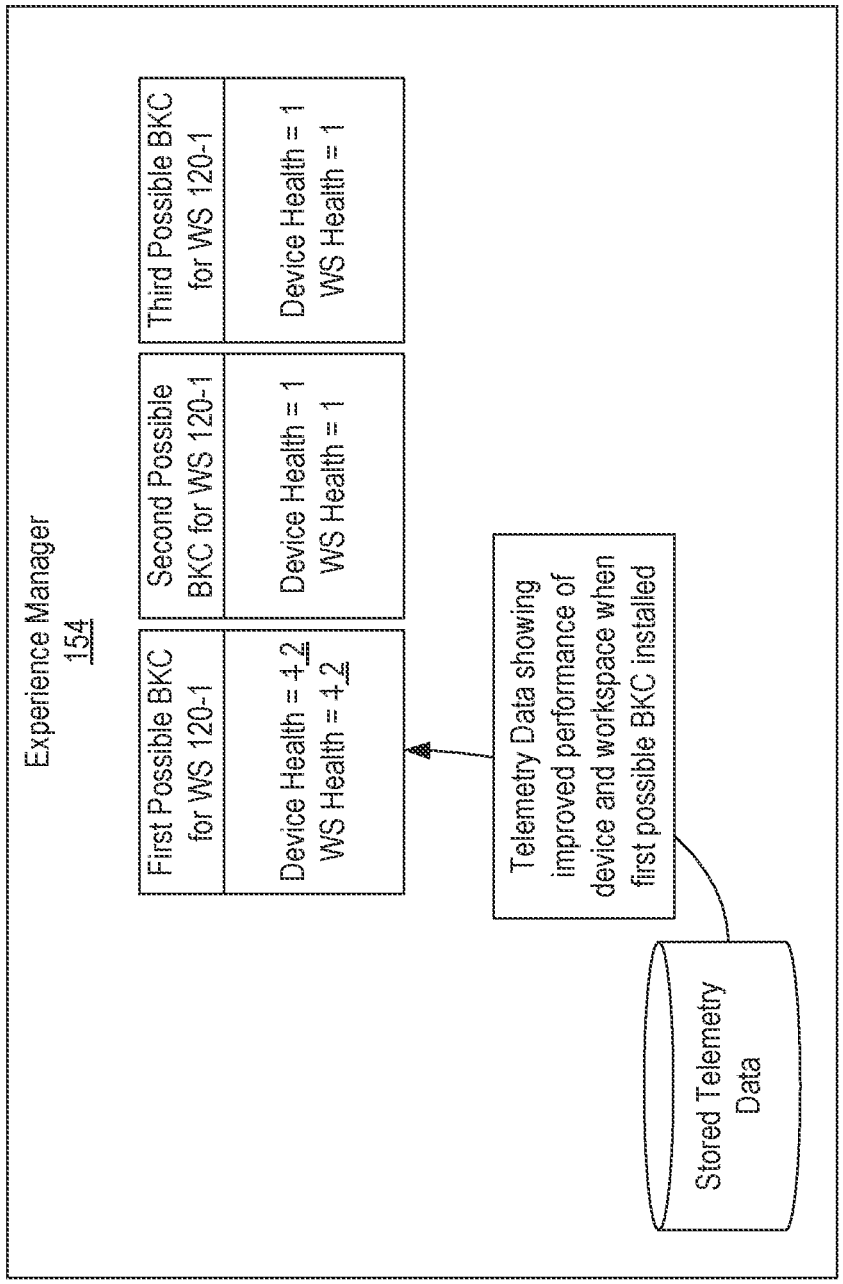

Turning to FIG. 9D, in step 4, experience manager 154 can evaluate the telemetry data pertaining to secure workspace 120-1 to determine whether to increment a health score for the possible best-known configuration to which the telemetry data pertains. For example, if telemetry data generated on a user computing device 100 after the first possible best-known configuration was created indicates that the performance of the user computing device and the performance of secure workspace 120-1 has increased, experience manager 154 can increment the device health score and the secure workspace health score for the first possible best-known configuration. Experience manager 154 can repeat step 4 whenever it receives additional telemetry data. Although not shown, if the telemetry data reveals that performance has decreased, the corresponding health score(s) can be decremented.

Figure 9E:
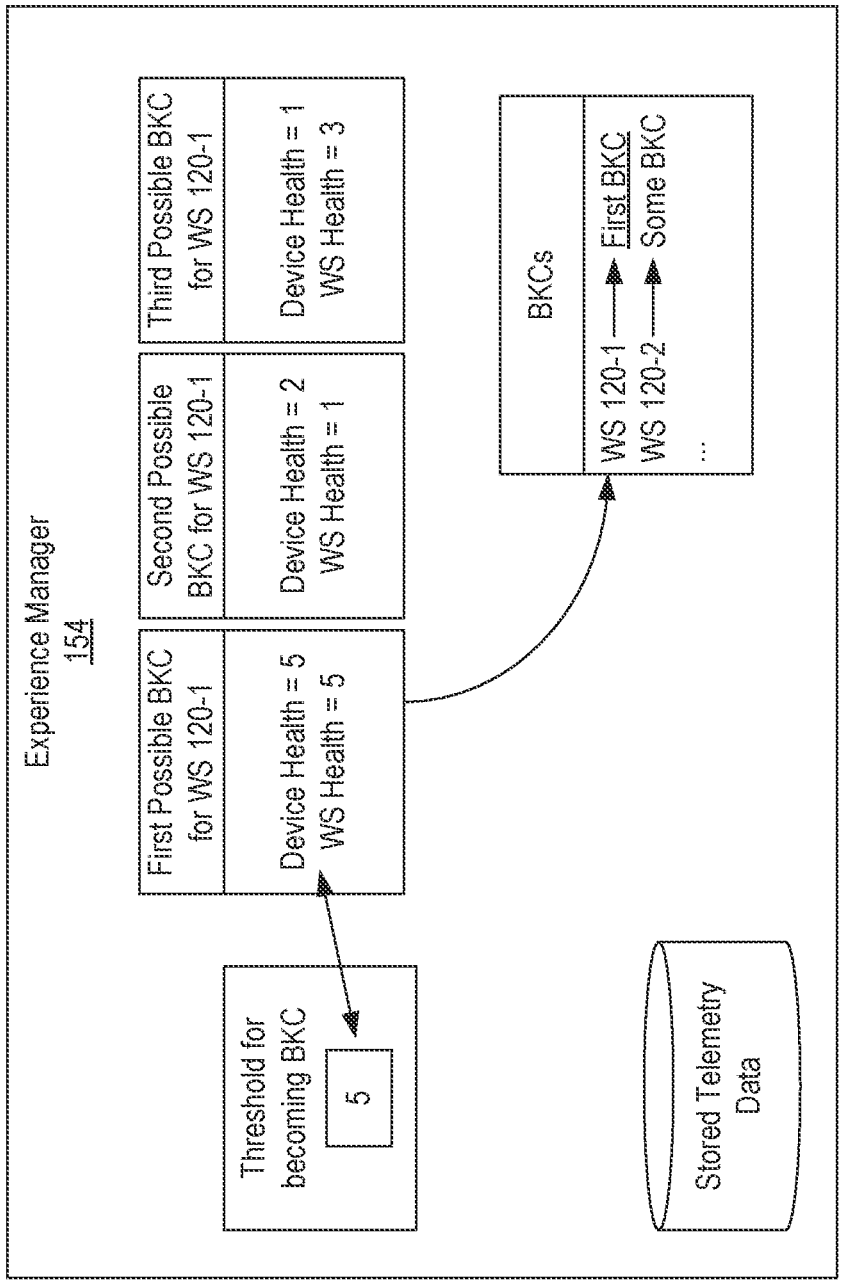

Turning to FIG. 9E, in step 5, experience manager 154 can determine whether the health score(s) of any possible best-known configurations for secure workspace 120-1 have met a defined threshold for becoming the best-known configuration. In the depicted example, it is assumed that the threshold is 5 and that both the device health score and the secure workspace health score have reached 5 as a result of step 4 being performed on telemetry data received from user computing devices 100. Accordingly, experience manager 154 is shown as setting the first possible best-known configuration as the best-known configuration for secure workspace 120-1. Notably, experience manager 154 could define best-known configurations for other secure workspaces such as secure workspace 120-2.

Figure 9F:
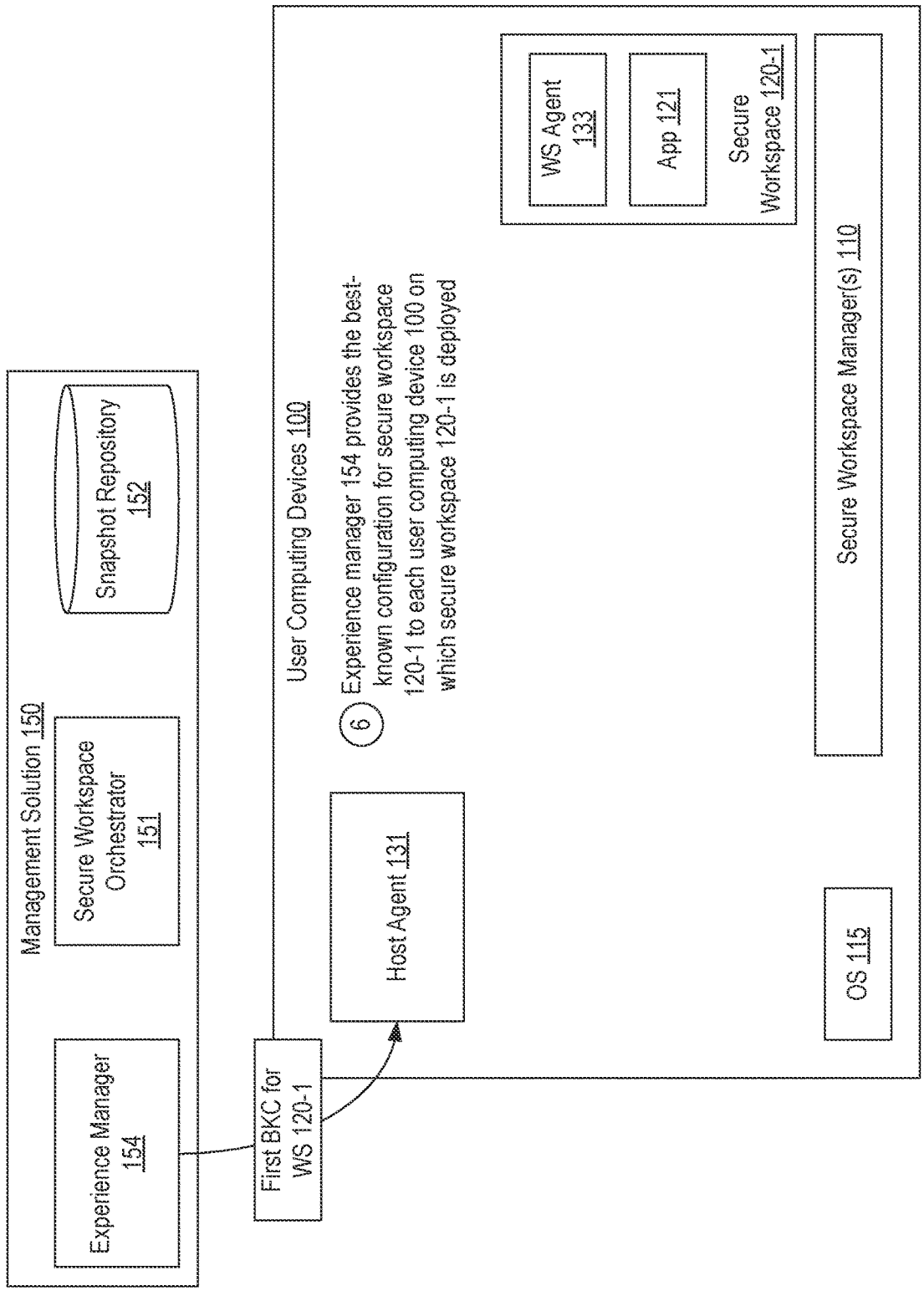

Turning to FIG. 9F, in step 6, experience manager 154 may provide the best-known configuration for secure workspace 120-1 to each user computing device 100 on which secure workspace 120-1 is deployed. Host agent 131 may then apply the best-known configuration unless it already exists on the user computing device (e.g., via deployment via a catalog).

Once a best-known configuration for a secure workspace is known, the best-known configuration can be provided to host agent 131 whenever the secure workspace is to be deployed on a user computing device 100. For example, if an application is hosted on a user computing device 100 in a different secure workspace but is to be migrated to a secure workspace with a best-known configuration, host agent 131 can be informed of the best-known configuration and can implement it when the application is migrated to the secure workspace.

In some embodiments, the best-known configuration may be integrated into an image from which the secure workspace is deployed. For example, experience manager 154 may inform secure workspace orchestrator 151 of the best-known configuration for a secure workspace, and secure workspace orchestrator 151 may build an image that includes the secure workspace and each BKC component that makes up the best-known configuration so that the secure workspace and the best-known configuration can be created with a single image.

In summary, by identifying and applying the best-known configuration, the performance of a secure workspace can be maximized on any user computing device on which the secure workspace may be deployed. In this way, the user experience can be enhanced.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for supporting secure workspaces in heterogenous environments, the method comprising:
   maintaining a snapshot of a secure workspace that is deployed on a user's primary user computing device;
   detecting that the user desires to access the secure workspace on the user's secondary user computing device;
   determining operating system details and trust information for the user's secondary user computing device; and
   providing the secure workspace to the user's secondary user computing device based on the operating system details and the trust information for the user's secondary user computing device such that:
   when the user's secondary user computing device is trusted, the secure workspace is deployed on the user's secondary user computing device; and
   when the user's secondary user computing device is not trusted, the secure workspace is streamed to the user's secondary user computing device.

2. The method of claim 1, wherein detecting that the user desires to access the secure workspace on the user's secondary user computing device comprises detecting that a host agent is loaded on the user's secondary user computing device.

3. The method of claim 1, wherein determining operating system details for the user's secondary user computing device comprises determining a type or version of the operating system on the user's secondary user computing device.

4. The method of claim 1, wherein determining trust information for the user's secondary user computing device comprises determining one or more of:
   whether a firewall is enabled on the user's secondary user computing device;
   whether secure boot is enabled on the user's secondary user computing device;
   whether antivirus protection is enabled on the user's secondary user computing device; or
   whether disk encryption is enabled on the user's secondary user computing device.

5. The method of claim 1, wherein providing the secure workspace to the user's secondary user computing device based on the operating system details and the trust information for the user's secondary user computing device comprises:
   determining that the operating system of the user's secondary user computing device matches an operating system of the user's primary user computing device; and
   deploying the snapshot of the secure workspace to the user's secondary user computing device.

6. The method of claim 1, wherein providing the secure workspace to the user's secondary user computing device based on the operating system details and the trust information for the user's secondary user computing device comprises:
   determining that the operating system of the user's secondary user computing device does not match an operating system of the user's primary user computing device;
   converting the snapshot; and
   deploying the converted snapshot of the secure workspace to the user's secondary user computing device.

7. The method of claim 1, further comprising:
receiving telemetry data representing performance of the secure workspace;
determining, from the telemetry data, that the performance improved after a possible best-known configuration was created; and
based on the improved performance, setting the possible best-known configuration as a best-known configuration for the secure workspace.

8. The method of claim 7, further comprising:
providing the best-known configuration for the secure workspace to one or more user computing devices on which the secure workspace is deployed or will be deployed.

9. The method of claim 7, wherein creating the possible best-known configuration comprises installing or applying one or more of: a runtime library, a runtime service, an enabler, an optimization service, a separate secure workspace, a configuration of an operating system, or a configuration of a secure workspace manager.

10. The method of claim 7, further comprising:
receiving other telemetry data representing performance of the secure workspace on other user computing devices; and
determining, from the other telemetry data, that the performance improved after the possible best-known configuration was created such that the possible best-known configuration is set as a best-known configuration for the secure workspace based also on the other telemetry data.

11. One or more computer storage media storing computer executable instructions which when executed implement a method for supporting secure workspaces in heterogenous environments, the method comprising:
maintaining a snapshot of a secure workspace that is deployed on a user's primary user computing device;
detecting that the user desires to access the secure workspace on the user's secondary user computing device;
determining whether the user's secondary user computing device is trusted;
when the user's secondary user computing device is trusted, deploying the secure workspace on the user's secondary user computing device; and
when the user's secondary user computing device is not trusted, streaming the secure workspace to the user's secondary user computing device.

12. The computer storage media of claim 11, wherein the method further comprises:
determining whether an operating system on the user's secondary user computing device matches an operating system on the user's primary user computing device.

13. The computer storage media of claim 12, wherein deploying the secure workspace on the user's secondary user computing device comprises sending the snapshot to the user's secondary user computing device when the operating system on the user's secondary user computing device matches the operating system on the user's primary user computing device.

14. The computer storage media of claim 12, wherein deploying the secure workspace on the user's secondary user computing device comprises converting the snapshot and sending the converted snapshot to the user's secondary user computing device when the operating system on the user's secondary user computing device does not match the operating system on the user's primary user computing device.

15. The computer storage media of claim 11, wherein the method further comprises:
receiving telemetry data representing performance of the secure workspace;
determining, from the telemetry data, that the performance improved after a possible best-known configuration was created; and
based on the improved performance, setting the possible best-known configuration as a best-known configuration for the secure workspace.

16. The computer storage media of claim 15, wherein the method further comprises:
receiving other telemetry data representing performance of the secure workspace on other user computing devices; and
determining, from the other telemetry data, that the performance improved after the possible best-known configuration was created such that the possible best-known configuration is set as a best-known configuration for the secure workspace based also on the other telemetry data.

17. A system comprising:
a primary user computing device on which a secure workspace is deployed;
a management solution that stores a snapshot of the secure workspace; and
a secondary user computing device;
wherein the management solution is configured to selectively provide the secondary user computing device with access to the secure workspace by:
deploying the snapshot or a converted snapshot to the secondary user computing device when the secondary user computing device is trusted; or
streaming the secure workspace to the secondary user computing device using the snapshot when the secondary user computing device is not trusted.

18. The system of claim 17, wherein the management solution deploys the snapshot or the converted snapshot based on an operating system of the secondary user computing device.

19. The system of claim 17, wherein the management solution is configured to select a best-known configuration for the secure workspace based on telemetry data generated while the secure workspace is deployed.

* * * * *